Sept. 20, 1960 S. D. WEAVER ET AL 2,953,399
BELL AND SPIGOT PIPE COUPLING HAVING MEANS TO
LIMIT THE ROLLING OF THE GASKET
Filed Nov. 18, 1957

INVENTORS
**SIMEON D. WEAVER
ALBERT A. HOLLINGSWORTH**

BY

ATTORNEY

United States Patent Office 2,953,399
Patented Sept. 20, 1960

2,953,399
BELL AND SPIGOT PIPE COUPLING HAVING MEANS TO LIMIT THE ROLLING OF THE GASKET

Simeon D. Weaver, Weaver, and Albert A. Hollingsworth, Anniston, Ala., assignors to Alabama Pipe Company, Anniston, Ala., a corporation of Alabama Filed Nov. 18, 1957, Ser. No. 697,052

6 Claims. (Cl. 285—374)

This invention relates to packing joints for metal pipes and consists more particularly in new and useful improvements in a packing joint for cast iron watermain pipe of the type provided with complementary bell and spigot sections.

An object of the invention is to provide a packing joint of this character, including an annular gasket of rubber or other elastic, compressible material which is particularly shaped to prevent the gasket from displacement during the insertion of the spigot section into the bell section, while at the same time allowing the gasket to roll only enough for the end of the spigot to be inserted without damage to the gasket.

Another object of the invention is to provide a gasket which is so shaped with respect to the coacting groove in the bell section, as to effect a static seal and including anchoring means for preventing displacement of the gasket during insertion of the spigot.

A further object of the invention is to provide an annular gasket having a torus in the central portion thereof for receiving the mechanical squeeze and effecting a static seal, said gasket having fore and aft rims shaped at an angle to permit the gasket to roll only enough for the end of the spigot to pass the torus without damage to the gasket.

Still another object of the invention is to provide a gasket, the central portion of which is composed of relatively soft rubber in the form of a torus, terminating fore and aft in anchoring rims bounded at their respective extremities by relatively hard rubber portions.

A still further object of the invention is to provide a sealing gasket having a central torus of relatively soft rubber or the like with fore and aft anchoring rims bounded at their respective extremities by relatively hard material and reinforced with an imbedded web of duck or other reinforcing material.

Still another object of the invention is to provide a packing joint for pipe sections having complementary bell and spigot sections, including a gasket adapted to be slightly compressed between the wall of the pipe and the bottom of the groove to effect a preloading of the gasket with a mechanical squeeze, the gasket being so shaped with respect to the contour of the complementary groove in the bell section, as to effect a tight seal under pressure and reinforced against blowout and cold flow after its installation.

A further object is to provide a packing joint wherein tht coacting surfaces of the gasket and bell groove, under the influence of pressure applied in the pipe line, facilitate a progressively increasing wedging of the gasket between the bell groove and the periphery of the spigot sections.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1:
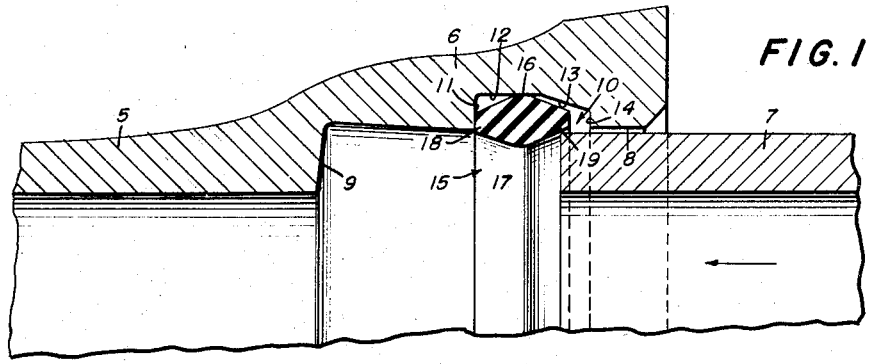
Figure 1 is a longitudinal sectional view of the pipe joint during the insertion of the spigot section into the bell section.

In the drawings, 5 represents the bell carrying section of pipe provided with an annular bell 6 adapted to receive the end of a spigot section 7 through its mouth 8. The interior of the bell and its mouth 8 are radially enlarged to accommodate the spigot 7 with a sliding fit, the inner longitudinal extremity of said interior terminating in a radial shoulder 9, against which the spigot 7 abuts when fully inserted.

Figure 2:
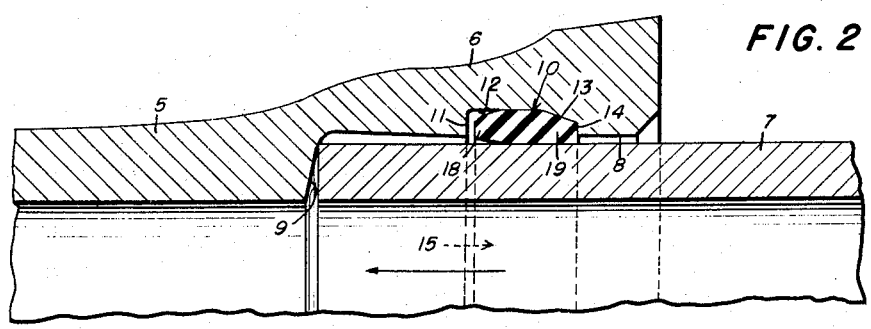
Figure 2 is a similar view showing the relationship of the parts after insertion of the spigot section and upon the application of pressure to the pipe line.

Intermediate the longitudinal extremities of the bell 6, its inner periphery is provided with an annular recess or groove 10 adapted to encircle the underlying portion of the spigot section 7 when the latter is inserted in the bell. As seen in Figures 1 and 2, the cross sectional profile of the groove 10 is defined by a radially extending inner end wall 11 which joins a right angularly disposed peripheral wall 12, the latter terminating in an angularly disposed portion 13 which converges outwardly toward the longitudinal axis of the bell 6. The angular portion 13 of the bell joins a second radial wall 14 which together with radial wall 11 defines the longitudinal extremities of the groove 10.

Figures 3, 4:
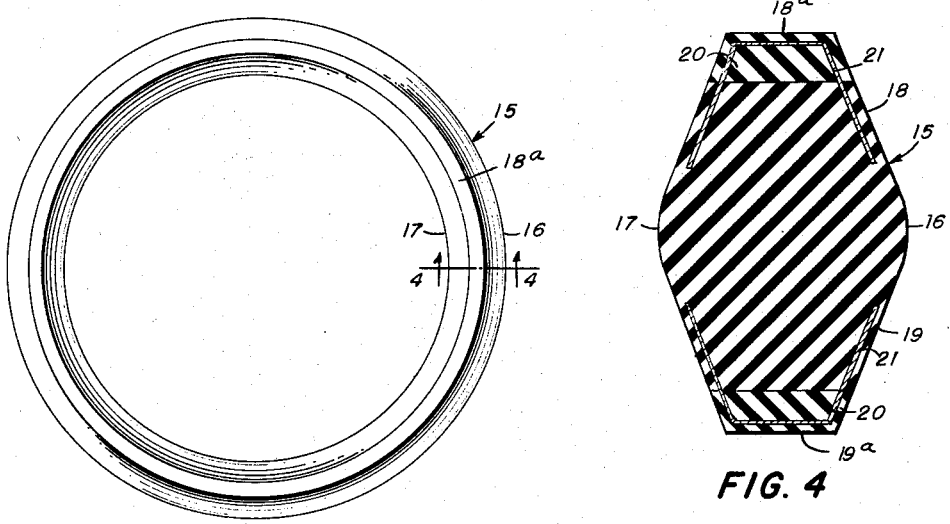
Figure 3 is a view of the gasket in side elevation.
Figure 4 is an enlarged transverse sectional view, taken on line 4—4 of Figure 3.

An annular gasket, generally represented by the numeral 15, is formed of rubber or other suitable elastic, compressible material and its outer diameter is such that when inserted in the groove 10, it will be slightly compressed between the outer straight wall 12 of the groove and the outer wall of the spigot section 7, thus preloading the gasket with a mechanical squeeze. The central portion of the gasket is in the form of a torus, defined by outer and inner arcuate faces 16 and 17 respectively, which are arcuate in cross section and oppositely disposed. As best seen in Figure 4, the cross sectional profile of a segment of the gasket defines substantially wedge-shaped fore and aft anchoring rims 18 and 19 respectively, said rims being bounded peripherally by inner and outer straight faces which lie in converging planes and terminate in flat tips 18a and 19a, lying in planes at right angles to the axis of the gasket. The fore and aft anchoring rims 18 and 19 are identical in size and contour, thus providing a symmetrical, completely reversible gasket which insures against the possibility of improper installation.

The radial thickness of the gasket between the arcuate pressure receiving surfaces 16 and 17 is greater than the corresponding depth of the groove 10 so that when the gasket is in place in said groove, the inner arcuate surface 17 normally protrudes axially inwardly from the groove, in line for engagement by the end of the spigot section 7. Also, the width of the gasket in fore and aft direction is normally less than the corresponding width of the groove 10 between the end walls 11 and 14. In other words, the relationship of the gasket to the groove is such as to allow a certain amount of distortion of the gasket without completely filling the groove, when the spigot 7 is inserted within the bell 6.

We are familiar with prior packing joints of this general nature, embodying a bell having an annular gasket groove and an annular rubber gasket seated snugly in the groove and surrounding the spigot. However, the fact that the relationship of the gasket and groove in these prior devices is such that the pressure on the gasket resulting from the insertion of the spigot causes it to be distorted and completely fill the groove renders such prior devices unsatisfactory for the purposes of the present invention. The joint of this invention was designed to provide an easily assembled or easily dis-assembled push-together pipe joint. The dimensions and shape of the groove in the bell and its relationship to the dimensions and shape of the gasket are such as to allow distortion of the gasket without completely filling the groove when the spigot of the pipe is made within the tolerances allowed under Federal specifications. A pipe within these specification tolerances will have a positive seal even if, after assembly of the joint, the spigot end is forced to one side by external loads, giving no clearance between the spigot end of the pipe and restricting orifice of the bell metal on one side and maximum clearance on the other side.

With the constructions according to the prior efforts above referred to, where the gasket completely fills the groove, this condition could only allow for very closely held tolerance of mating bell and spigot as the completely confined rubber would completely fill the groove and would resist any effort to insert a spigot of any size larger than a very carefully prepared spigot of correct size and any undersized bell would have the same effect. However, with the joint of the present invention, assembly and dis-assembly with hand tools is easily effected regardless of close tolerances and the joint will withstand bursting pressures of cast iron pipe that are made within tolerance diameters of cast iron pipe specifications.

Thus, when the spigot section 7 is inserted through the mouth 8 of the bell as shown in Figure 1, it abuts the inner arcuate surface 17 and compresses the torus 16–17 between the outer periphery of the spigot 7 and the inner periphery of the straight portion 12 of groove 10. Due to the cross sectional shape of the gasket as above described, the pressure from the mechanical squeeze as the spigot is inserted is applied only to the torus, thus making the static seal. The fore and aft rims 18 and 19 are shaped at such an angle as to allow the gasket to roll only enough for the end of the pipe 7 to pass the torus without damaging it. The insertion of the spigot compresses the central portion of the gasket and causes the gasket to extend fore and aft into sealing engagement with a converging wall 13 of the groove 10 and the outer periphery of the spigot 7, the shape of the rims preventing the gasket from sliding further into the bell during assembly, by fouling out against the side of the groove. The rims also serve as backup rings, preventing the extrusion of the rubber of the gasket after prolonged high pressures within the pipe.

As shown in Figure 2, when the joint is assembled and pressure is applied to the pipeline, the gasket 15 is caused to shift aft in the groove 10. Due to the coacting angular faces of the aft rim 19 and converging groove surface 13, the rim 19 is wedged into the aft portion of the groove against the periphery of the spigot 7 while the remainder of the gasket adapts itself substantially to the contour of the groove.

The gasket 15 may be composed of one type of material throughout, as shown in Figures 1 and 2, or it may have a composite form as shown in Figure 4. In the modified form of Figure 4, the outer extremities of the rims 18 and 19 are composed of a harder rubber-like material 20 which facilitates the anchoring of the gasket in the groove while the spigot section is being inserted and also reinforces the gasket against blow-out at high pressures and against cold flow of the intermediate soft rubber portion, either under vacuum or pressure.

As also shown in Figure 4, it is further contemplated to additionally reinforce the rims 18 and 19 by imbedding within their confines, strips of duck 21 or other suitable reinforcing material. These strips of duck extend from points adjacent the torus formed by the arcuate surfaces 16 and 17, around the fore and aft portions of the rims and add greatly to the strength and performance of the gasket.

It will thus be seen that the present invention offers a decided improvement over the conventional so-called O-rings and insures a dependable sealing engagement between the spigot and bell sections while eliminating the possibility of flowing or blowing out under pressure and vacuum.

From the foregoing, it is believed that the invention may be readily understood by those skilled in the art, without further description, it being borne in mind that numerous changes may be made in the details disclosed, without departing from the spirit of the invention as set forth in the following claims.

We claim:
1. A pipe packing joint comprising a spigot section, a complementary, coaxial bell section, an annular, internal groove in said bell section adapted to encircle the end of said spigot section with a sliding clearance and having substantially radial end surfaces and a cylindrical bottom surface, an annular gasket of elastic, compressible material insertable in said groove, a cross section through any segment of said gasket defining identically contoured fore and aft rims respectively bounded by end surfaces and on opposite sides by straight surfaces which lie in outwardly converging planes, the respective straight surfaces of opposite rims being joined by opposed inner and outer arcuate pressure receiving surfaces, the radial thickness of said gasket between said arcuate pressure receiving surfaces being greater than the corresponding depth of said groove, said inner arcuate surface normally protruding radially from said groove said end surfaces of said gasket being aligned with said groove end surfaces, and the width of said gasket in fore and aft direction being less than the corresponding width of said groove, in line for engagement by the end of said spigot section, whereby upon the insertion of said spigot section in said bell section said gasket is preloaded by a mechanical squeeze on said opposed pressure receiving surfaces and undergoes a limited rolling motion on said groove bottom surface to facilitate the entry of the end of said spigot section, said gasket being compressed radially and extended fore and aft into sealing contact between said spigot section and the confines of said groove without completely filling said groove.

2. A pipe packing joint as claimed in claim 1, wherein the respective fore and aft extremities of said rims are formed of relatively hard material.

3. A pipe packing joint as claimed in claim 1, wherein the extremities of said rims are provided with reinforcing material.

4. A pipe packing joint as claimed in claim 1, wherein said rims are provided with an imbedded reinforcing material.

5. A pipe packing joint as claimed in claim 1, wherein the opposite extremities of said rims are formed of relatively hard material and including reinforcing webs.

6. A pipe packing joint as claimed in claim 1, wherein the opposite extremities of said rims are formed of relatively hard material and including imbedded reinforcing webs.

References Cited in the file of this patent

UNITED STATES PATENTS

| | | |
|---|---|---|
| 853,900 | Saunders | May 14, 1907 |
| 1,636,363 | Hettinger | July 19, 1927 |
| 2,205,910 | Raybould | June 25, 1940 |
| 2,245,153 | McWane | June 10, 1941 |
| 2,365,574 | McWane | Dec. 19, 1944 |
| 2,398,399 | Alexander | Apr. 16, 1946 |
| 2,738,992 | Heisler | Mar. 20, 1956 |

FOREIGN PATENTS

| | | |
|---|---|---|
| 454,900 | Great Britain | Oct. 9, 1936 |
| 514,072 | Italy | Feb. 8, 1955 |